United States Patent [19]

Souffie

[11] 3,878,285

[45] Apr. 15, 1975

[54] PROCESS AND APPARATUS ARRANGEMENT FOR HIGH SPEED INJECTION MOLDING AND CURING OF LARGE, THICK CROSS-SECTION OBJECTS OF ELASTOMERIC MATERIAL

[75] Inventor: Robert David Souffie, Wilmington, Del.

[73] Assignee: E. I. du Pont de Nemours and Company, Wilmington, Del.

[22] Filed: Sept. 7, 1973

[21] Appl. No.: 395,249

Related U.S. Application Data

[63] Continuation-in-part of Ser. No. 180,765, Sept. 14, 1971, abandoned.

[52] U.S. Cl................................ 264/329; 264/328
[51] Int. Cl............................................ B29h 3/08
[58] Field of Search........................... 264/328, 329

[56] References Cited
UNITED STATES PATENTS
3,660,552  5/1972  Hinz.................................... 264/329

OTHER PUBLICATIONS
Modern Plastics, Giant Machines for the Big Jobs, pp. 101 & 104 relied on, Jan. 1969.
Frimberger, et al., Rubber Molding with the Reciprocating Screw, Society of Plastics Engineers, Tech. Papers, V. XI; VIII-3, p. 1 to 5.

Primary Examiner—Richard R. Kucia

[57] ABSTRACT

A high speed combination for injection molding and rapidly uniformly curing relatively large, heavy objects having at least one cross-section greater than one-quarter inch formed of elastomeric material having a minimum Mooney viscosity M/S at 250°F. of 5–60 and scorch value of 10–40 minutes to 10-point rise, the combination involving rapid mastication and heating of precompounded solid feed material, rapid injection and curing to a point permitting removal of molded objects from a mold cavity without significant damage, an important feature being a specified arrangement for rapid controlled heating of the masticated stock to a very rapid curing temperature by restricting a dimension of at least one transverse cross-section of the stream of material being injected into a mold cavity, the heating occurring internally uniformly and without significant heat addition otherwise, or losses, by reason of maintaining the mold cavity and injection passageways which restrict flow at about the same temperature as the temperature of the injected material which is at a rapid curing temperature, the details of the specified features of the combination cooperating to provide injection and curing in a very short time to allow molding cycle times of less than about 4 minutes, suitable for commercial production of said objects, and operation of the combination at maximum efficiency.

2 Claims, 3 Drawing Figures

INVENTOR
ROBERT DAVID SOUFFIE

ATTORNEY

PROCESS AND APPARATUS ARRANGEMENT FOR HIGH SPEED INJECTION MOLDING AND CURING OF LARGE, THICK CROSS-SECTION OBJECTS OF ELASTOMERIC MATERIAL

CROSS-REFERENCE TO RELATED APPLICATION

This is a continuation-in-part of my application Ser. No. 180,765, filed Sept. 14, 1971, now abandoned.

BACKGROUND OF THE INVENTION

This invention relates generally to the field of forming resilient objects from elastomeric stock materials and more specifically to the field of process and apparatus combinations for the high speed production of large, heavy objects of relatively thick cross-section such as resilient high strength automobile bumper and tire members of heat curable elastomers utilizing improved injection molding arrangements and techniques.

It is one object of the invention to shorten the molding cycle, particularly the injection and curing times relative to the time for mastication and heating in the production of such large, heavy objects.

It is another object of the invention to provide novel and improved arrangements for producing such objects from elastomeric materials, which arrangements are simple and economical to construct, operate, and maintain, yet rugged, reliable and effective in operation.

Other objects and advantages will become apparent from the following specification, claims and accompanying drawings.

General arrangements and general teachings relating to molding of heat-curable materials utilizing internally generated frictional heat in the injected material are known in the prior art. Examples of such prior art items are U.S. Pat. Nos. 2,478,013, 2,742,669, an article entitled "Injection Moulding With Natural Rubber," by M. A. Wheelans, at page 160 of the Journal of the I.R.I. of August, 1970, and the H. J. Stern textbook, entitled "Rubber: Natural and Synthetic," 2nd edition, published by Palmerton Publishing Co., Inc., New York, N.Y., pages 349, 350 and 351 being of particular interest. The Stern textbook discusses in general terms, injection molding of rubber in which frictional heat is generated in the injected material and used to effect curing or vulcanization in the mold.

Applicant's major problem specifically has been the efficient production of large, heavy objects of relatively thick cross section from elastomeric materials at rates which are economically feasible for commercial mass production.

The principal difficulty is caused by the fact that with the increase of the size of a molded object, effective heat penetration throughout the elastomer mass in the mold becomes more and more difficult. While a small article, such as, for example, a gasket, has a large surface relative to its mass and can effectively absorb heat from the mold throughout its entire thickness, a large and thick article would normally require a long holding time in the mold to effect complete cure. Even under those conditions, however, it normally is observed that the outer portion of such large article is overcured, while the inner core is undercured. Thus, the prior art had no effective means of molding large and heavy elastomeric articles, especially on commercial scale. In order to reach practical commercial production rates and at the same time produce molded articles of good quality, it is necessary to increase the temperature of the incoming rubber stock to such a level that the stock will flow smoothly into the mold without scorching (curing prematurely) and will shape and cure in a very short time.

SUMMARY OF THE INVENTION

The objects of the invention have been achieved and the problem of accomplishing commercially feasible injection molding of large, heavy objects of elastomeric material, having at least one cross-section larger than one-quarter inch, has been solved by the improved process and means arrangement of this invention. In one preferred form this arrangement comprises the following steps:

1. Supplying precompounded, solid, uncured, heat-curable elastomeric stock at a temperature within the range of about room temperature to 150°F. to a confined masticating and heating zone, such as the barrel of a screw-injection molding machine; the stock having a minimum Mooney viscosity value, M/S, at 250°F. of about 5–60 and a scorch value of 10–40 minutes to 10-point rise.

2. Masticating and heating during a period of less than about 60 seconds the elastomeric stock in the confined zone while transporting it forward by means of the screw; the barrel being heated to such a temperature that the elastomeric stock, which is heated both by the walls of the barrel and by the mastication, reaches in the forward end of the barrel (in front of the screw) a uniform temperature of about 220°–260°F.

3. Forcing the elastomeric stock through one or more restricted passages at a sufficient pressure to heat the stock to about 320°–400°F. into a mold cavity maintained at substantially the same temperature as the incoming rubber stock, this step being completed in less than about 30 seconds.

4. Allowing the elastomeric stock to remain in the mold cavity for a period of about 20–90 seconds, during which time the stock is both shaped and uniformly cured.

DETAILED DESCRIPTION OF THE INVENTION

Figure 1:
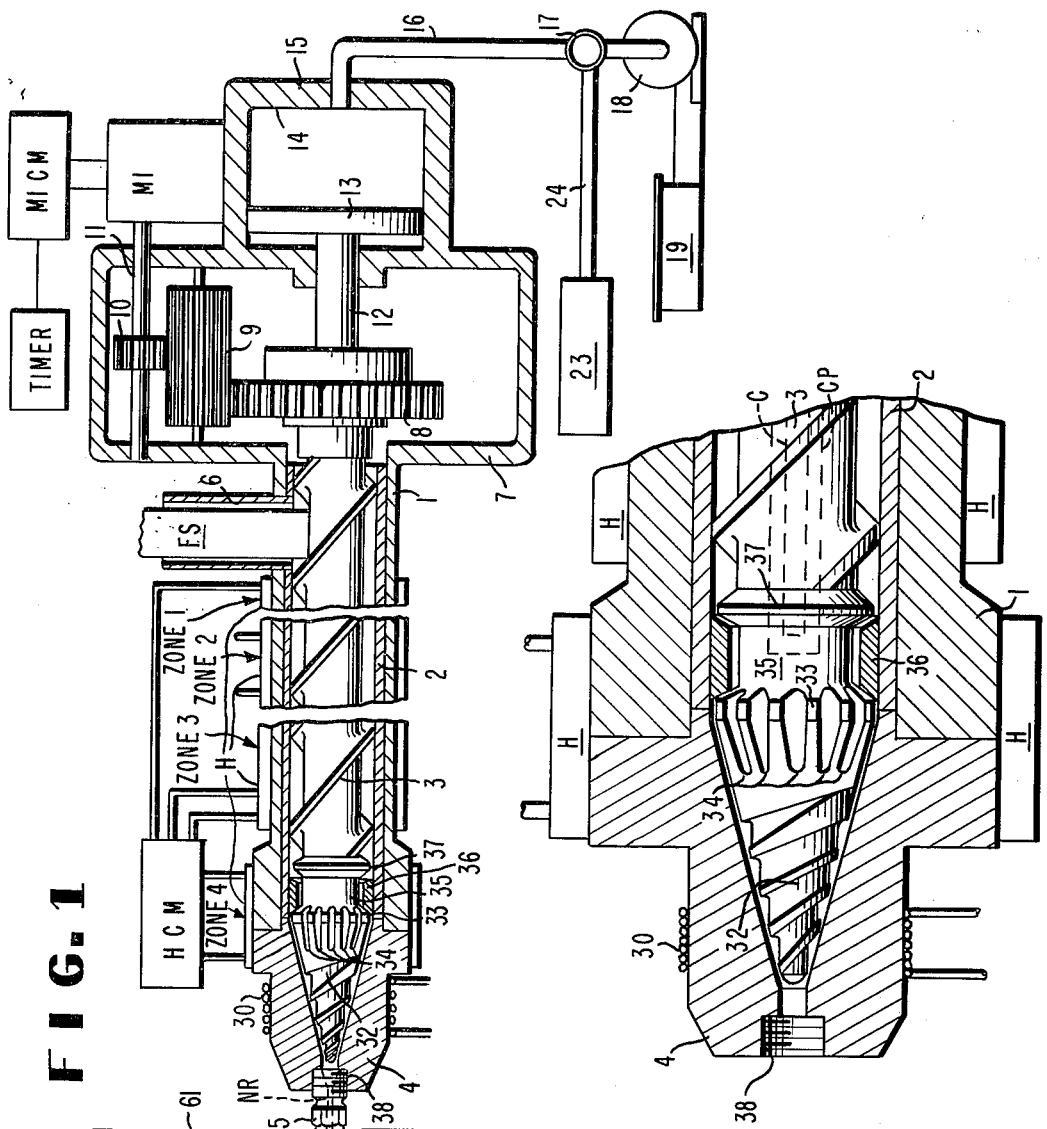
FIG. 1 is a side elevational view in partial cross section of the injection molding apparatus combination embodying features of the invention.

In the operation of the process of the present invention, the elastomeric stock is usually supplied to the machine in strip or pellet form. The temperature range of the feed recited in the Summary is not critical but is considered to be most practical because above 150°F. the elastomeric stock may prematurely cure in the barrel (i.e., undergo scorch), while below room temperature the stock usually is so stiff that it requires a high torque to mix and may not feed well.

The physical properties of the stock are critical since below a viscosity of 5 the stock is too soft to feed and does not build up heat readily. Those low viscosity stocks also sometimes contain air. Above a viscosity of 60 the stock requires high machine torque and is so heat-sensitive that it may scorch in the barrel. The scorch safety range of 10–40 min. is based on the observation that below the lower limit the stock will probably scorch even if it is very low in viscosity, while above the higher limit the cure rate is impractically low, so that long mold time would result. The Mooney scorch and viscosity data are determined according to ASTM Method D-1646.

The stock is heated and masticated until it reaches the 220°–260°F. range. Below the lower limit of this range, the stock would require a very high pressure to fill the mold cavity, and the fill time and cure time both would tend to be long. Above 260°F., the stock is likely to precure, and the resulting molded article can be expected to have either incompletely filled or precured sections.

The heated and masticated stock is injected through one or more restricted passages into the mold cavity. This can be accomplished either by using a small cross-section nozzle or by restricting the openings of the sprue, runners, and gates, as will be explained below with reference to the drawings. It is also possible to use a combination of the above two alternatives. The purpose of this step is to increase the temperature of the elastomeric stock to about 320°–400°F., which is the fastest operable curing temperature for a stock having the required viscosity and scorch properties. If, for example, a small cross-section nozzle is used, sufficient pressure is applied to raise the stock temperature to the range of 270°–300°F., at which the elastomer is sufficiently fluid. To raise the temperature from 220°F. to 270°F., the required pressure differential (between the high pressure side and the low pressure side) is approximately 5,000 psig; from 220°F. to 300°F., 8,000 psig; from 260°F. to 275°F., 1,500 psig, and from 260°F. to 300°F., 4,000 psig.

The molten elastomeric stock is forced through the sprue, runners, and gates with sufficient pressure to raise its temperature to 320°–400°F. The following illustrative pressure differentials are required for selected temperature increments:

| | |
|---|---|
| From 270°F. to 320°F. | 5,000 psig |
| From 270°F. to 400°F. | 13,000 psig |
| From 300°F. to 320°F. | 2,000 psig |
| From 300°F. to 400°F. | 10,000 psig |

It is to be understood, however, that the increase of stock's temperature from about 220°–260°F. to about 270°–400°F. can be accomplished primarily in the nozzle or primarily in the sprue, runners, and gates, and that the proportion of temperature increase in each one of the above machine components is not critical. A stock temperature at the nozzle exit below 270°F. requires a very high pressure differential in the sprue and runners to increase the stock temperature to the curing temperature; if the proper cure temperature is not reached, the cure time is impractically long. A stock temperature at the nozzle exit above 300°F. may cause scorch in the sprue, runners, or partly filled mold cavity.

It has been determined that a cure temperature below 320°F. results in a cure time of more than 90 sec., which is the maximum desirable time of the molding step. If, however, the stock temperature is above 400°F., the elastomer may scorch prior to filling the cavity. When the mold temperature is substantially the same as the stock temperature, within the 320°–400°F. range, a uniform cure is obtained in both thick and thin sections within the desired time of 20–90 seconds.

A representative apparatus suitable in the process of the present invention is shown in the drawings. The apparatus shown comprises a supporting frame or housing structure 1 in which is supported a barrel, or cylinder, member 2. A double-flighted non-compression screw member 3 is mounted in the hollow interior portion or bore of the barrel member 2 for both reciprocation and rotation. The screw member is provided with a hollow interior portion CP in which is mounted a conduit C for the purpose of circulating a fluid for controlling the temperature of the screw member. The interior portion of barrel member 2 defines a masticating and heating zone for stock material FS supplied to the zone via feed passageway 6. A closure or cylinder head member 4 is secured to one end of structure 1 and cylinder member 2 by suitable means such as machine bolts (not shown) to define one end of the masticating and heating zone. Member 4 is provided with a passageway therethrough as shown which communicates with a passageway NR in a nozzle member 5 which is maintained in threaded engagement with a recess 38 in closure member 4. Frame member 1 is provided at its other end with an enlarged portion 7 into which one end portion 12 of the screw member 3 extends. A rotary gear element 8 is rigidly secured on the end portion 12 of screw member 3. Gear element 8 meshes with an axially elongated idler gear element 9 which is rotatably mounted in enlarged portion 7. Gear element 9 meshes with drive gear 10 on drive shaft 11 which also is suitably mounted for rotation in enlarged portion 7 of the housing or frame structure 1. Drive shaft 11 is driven by a suitable drive means such as electric or hydraulic motor MI under the control of a motor control means MCM and a timer means as shown.

End portion 12 of screw member 3 is provided with a piston element 13 which is slidably received in a cylinder chamber 14 in portion 15 of enlarged housing portion 7. Cylinder chamber 14 is filled with a hydraulic fluid and connected to a suitable source of pressurized fluid such as pump 18 by conduit 16 and control valve 17 which is operated by a suitable control unit 23 via conductors 24. Application of pressurized fluid to chamber 14 moves screw member to the left to the position shown in FIG. 1.

Figure 2:
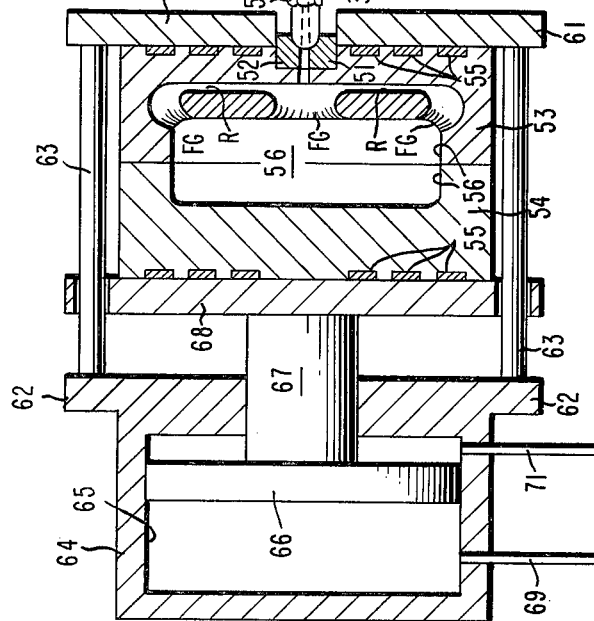
FIG. 2 is an enlarged view of the injection nozzle portion of the apparatus of FIG. 1 to show the details of construction thereof.
Figure 3:
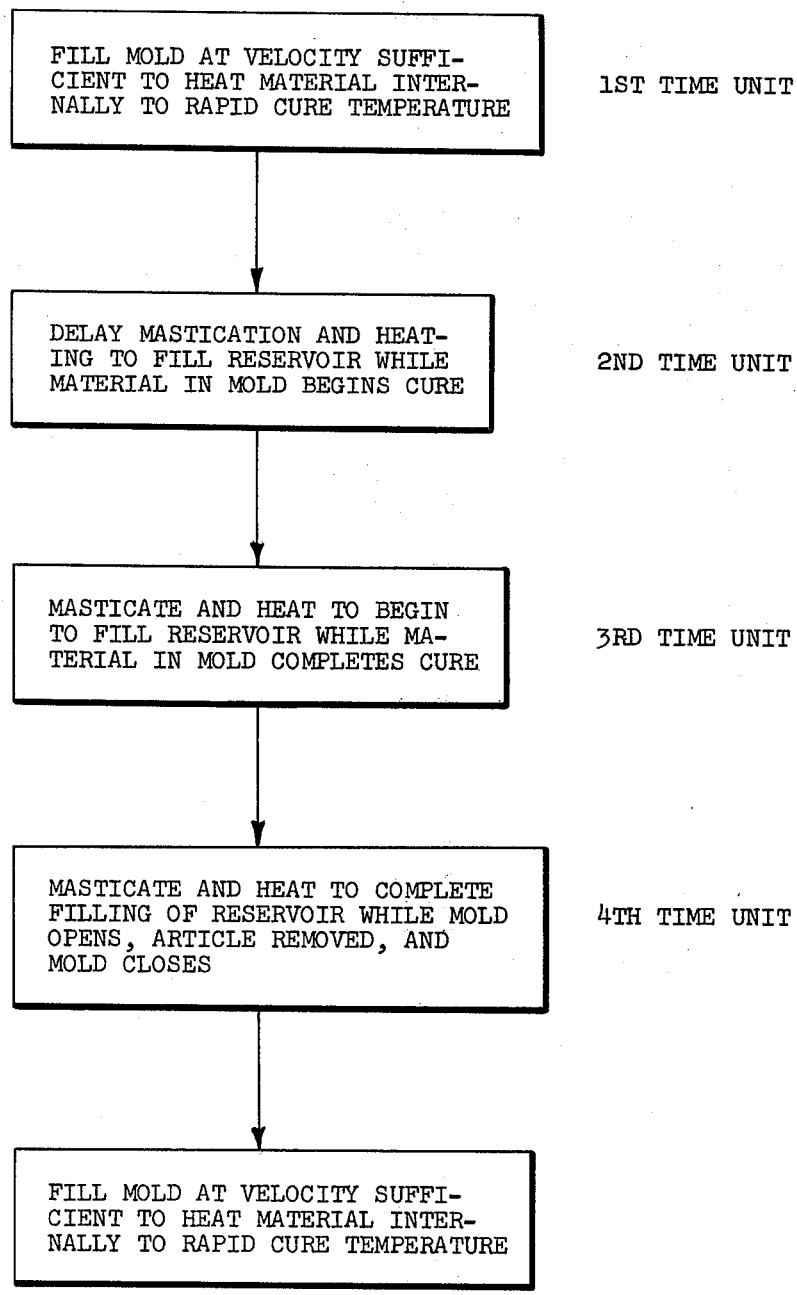
FIG. 3 is a flow chart illustrating the time sequence of operation of the process.

The other end of screw member 3 is provided with a tapered end portion having a screw flight 32 formed thereon. Adjacent the tapered end portion is a first enlarged circumferentially extending portion 33 and a second enlarged circumferentially extending portion 37 between which is a portion 35 of reduced diameter. There is a clearance between the exterior of enlarged portion 37 and the interior of barrel member 2. Enlarged portion 33 is provided with a circumferentially spaced longitudinally extending slots or channels 34 as shown in FIGS. 1 and 2. A sleeve-like valve member 36 is positioned in portion 35 of the reduced diameter with an external diameter closely fitting the interior or barrel member 2 and due to its short longitudinal dimension able to move longitudinally between one position in engagement with enlarged portion 33 and another position in engagement with enlarged portion 37.

Barrel member 2 and structure 1 are provided with means for controlling the temperature of the masticating and heating zone. This means comprises a plurality f heating jackets 4 longitudinally spaced in four zones along the barrel member from the feed passageway 6 to cylinder head member 4 to maintain the desired temperature condition. Heated fluid is circulated through the heating jackets 4 under control of heating control means HCM. An additional heat control conduit 30 is provided on cylinder head member 4 for heating or cooling thereof as desired.

A mold cavity 56 is defined by cooperating structures of a fixed mold member 53 and a movable mold member 54. Mold member 53 is rigidly secured by suitable conventional means (not shown) to a fixed platen member 61 and is provided with passageways comprising gates FG and runners R connecting the mold cavity to a passageway in a sprue bushing member 52 which is removably mounted in a recess in this mold member as shown.

Sprue bushing member 52 is provided with a passageway therethrough which cooperates with the nozzle member 5 restricted passageway NR to maintain free communication through the bushing member and nozzle member to the interior of the barrel member.

Rigid platen member 61 is rigidly connected to stationary structural member 62 by a plurality of rod or tie bar elements 63. The movable mold member 54 is rigidly secured by suitable conventional means (not shown) to a movable platen member 68 which is provided at its other end with a piston member 66 which is mounted for reciprocating movement in a chamber 65 filled with a hydraulic fluid. Chamber 65 is connected by suitable conduits 69 and 71 to a suitable source of pressurized fluid MAM, such as a pump controlled by a control means CM and a timer means as shown. Movable platen member 68 is provided with bearing portions through which the tie bar elements 63 extend in order to act as guides for the movement of the movable mold and its platen.

Passageways 55 are provided in both fixed and movable mold members for the circulation therethrough of a heat transfer medium for control of the temperature of the mold cavity and members.

In operation, the screw member 3 is rotated in the direction shown by the arrow in FIG. 1 by operation of motor MI at a speed sufficient to masticate and heat feed stock material supplied into feed passageway 6. The material being masticated and heated is moved by the screw flights of the screw member toward the left and the cylinder member as viewed in FIG. 1, passing between the outer periphery of enlarged portion 37 in the screw and the inner surface of the barrel member 2 through radially reduced portion 35 of the screw member, forcing valve element 36 to its left-most position against enlarged portion 33 of the screw member, and moves through channels 34 into the space between the tapered ends 32 of the screw member and the closure member 4. As this material moves into this space the screw member is gradually moved to the right as viewed in FIG. 1 with gear 8 sliding axially along elongated idler gear 9, until the desired amount of material has been accumulated. The pressure developed in the material by the screw rotation is high enough to slide the screw member to the right and force fluid out of chamber 14 due to the action of valve unit 17 and the fact that pump means 18 is not operating at this point. However, this pressure and the viscosity of the material being masticated and heated is not sufficient to cause the material to move through the restricted passageway NR in nozzle member 5. The rotation of the screw and operation of the barrel heating control means HCM with jackets H are established to elevate and maintain, within a first time interval, the temperature of the material being accumulated at an elevated level to reduce viscosity thereof to substantially the lowest level possible without scorching or precuring of the material in this heating and masticating zone.

When the desired amount of this heated material has been accumulated in the barrel member 2 between the tapered portion 32 of the screw member 3 and the nozzle member 5, the mold member being in closed position, operation of motor MI and rotation of the screw member is stopped, and pump means 18 and valve unit 17 are energized to supply pressurized fluid rapidly to chamber 14. The pressurized fluid in chamber 14 forces piston 13 to the left carrying with it screw member 3. This movement of the screw member 3 causes the valve element 36 to move to the right engaging enlarged portion 37 to prevent movement of the masticated material to the right along the screw member, and in addition causes substantially all of the accumulated heated material to flow through the restricted passageway NR in the nozzle, the passageway in bushing member 52, the mold runner passageways R and gates FG into the mold cavity very rapidly. The pressure of the fluid supplied to chamber 14 is sufficiently high and screw member movement is sufficiently rapid relative to the length and dimensions of the passageway connecting the interior of the barrel member and the mold cavity that the material being moved through the passageway becomes internally heated due to friction to a sufficiently high temperature at which very rapid curing occurs by the time it moves into the mold cavity. This pressure and character of the passageway must also cooperate to insure that the mold cavity is filled before substantially any curing occurs.

Before entry of the material into the molding cavity, the mold temperature is maintained at a temperature very close to that of the incoming material. The mold and material contained therein are maintained at this elevated temperature to cause very rapid uniform curing throughout the material sufficient to permit removal thereof from the mold cavity without significant damage at the end of 20 to 90 seconds. The mold is opened by supplying pressurized fluid to the right side of portion 66 from mold actuating pump means MAM and releasing pressure on the left side of the piston member 66. The molded material is removed for further processing, which usually involves an additional curing step in a suitable heated curing oven until the final cure conditions are achieved. The mold is closed by releasing pressure in conduit 71 and supplying high pressure fluid through conduit 69 to the left side of piston 66.

The pressure on the right side of piston 13 is released a sufficient time interval after filling of the mold cavity to permit material in the nozzle passageway and bushing member 52 passageway to cure. After a time interval delay following this release of pressure, screw rotation and accumulation of heated material for the next mold filling operation begins. This delay is selected so that by the time the material completes its cure in the mold cavity, the mold is opened; the molded article removed; and the mold is closed; the screw member will have masticated, heated and accumulated the next amount of material for the next mold filling operation, so that filling of the mold cavity can commence without delay which could cause precuring or scorching in the barrel member. Control of this time delay is achieved by means of a suitable timer means action initiated by any suitable event having the desired time relation to the release of pressure on the material in the mold cavity and passageways connected therewith. A suitable time delay is less than thirty seconds.

Any commercial injection-molding machine capable of developing sufficient injection pressures and having nozzle, gate, and runner openings adapted to allow elastomeric stock to be transported forward and to be injected into a mold within specified short times, while at the same time reaching within each zone the required temperature ranges, and communicating with a mold of suitable size, which can be heated to the required temperature range, can be used in the process of this invention. The total molding cycle from the beginning of the mastication step to the removal of the cured material from the mold is, under the conditions of this invention, less than about 4 minutes.

Elastomeric materials suitable in the process of this invention include natural and synthetic rubbers and combinations of these, in addition to the combination thereof with limited amounts of thermoplastic materials such as polyethylene or polypropylene. Suitable elastomers include, for example, EPDM rubbers, SBR, neoprene, nitrile rubber, chlorosulfonated polyethylene, etc.

The following representative elastomer formulations are suitable in the process of the present invention:

1. Ethylene/propylene/1,4-hexadiene terpolymer. Nordel

| | | | Mooney viscosity and scorch M/S at 250°F. | |
|---|---|---|---|---|
| | | | Visc. | 't10 |
| (a) | Nordel 1070 | 100 | | |
| | ZnO | 5 | | |
| | Stearic acid | 1 | | |
| | FEF carbon black | 95 | | |
| | Circosol 4240$^{(a)}$ | 115 | | |
| | Sulfur | 2 | 14 | 13 |
| | Zinc dibutyldithiocarbamate | 2 | | |
| | MBT$^{(b)}$ | 1 | | |
| | Thiuram M$^{(c)}$ | 0.5 | | |
| | Tellurium diethyldithiocarbamate | 0.4 | | |
| | Dibutyl thiourea | 0.4 | | |
| (b) | Nordel 1145 or 1245 | 100 | | |
| | ZnO | 5 | | |
| | Stearic acid | 1 | | |
| | HAF carbon black | 80 | | |
| | Process Oil | 50 | | |
| | Sulfur | 1.5 | 25 | 21 |
| | Zinc dibutyldithiocarbamate | 2 | | |
| | Thiuram M$^{(c)}$ | 0.5 | | |
| | MBT$^{(b)}$ | 1 | | |
| (c) | Nordel 1070 | 100 | | |
| | ZnO | 5 | | |
| | Stearic acid | 1 | | |
| | FEF carbon black | 60 | | |
| | Arochlor 1252$^{(d)}$ | 30 | 44 | 38 |
| | Sulfur | 1.5 | | |
| | Thionex$^{(e)}$ | 1.5 | | |
| | MBT$^{(b)}$ | 0.5 | | |

(2) Neoprene

| | | | Mooney viscosity and scorch M/S at 250°F. | |
|---|---|---|---|---|
| | | | Visc. | 't10 |
| (a) | Neoprene GN | 100 | | |
| | Neozone A$^{(f)}$ | 2 | | |
| | Magnesia | 4 | | |
| | Stearic acid | 0.5 | 19 | 17 |
| | SRF Black | 58 | | |
| | Process Oil | 12 | | |
| | ZnO | 5 | | |
| | NA-22$^{(g)}$ | 1 | | |
| (b) | Neoprene WRT | 100 | | |
| | Magnesia | 4 | | |
| | Stearic acid | 0.5 | | |
| | Petrolatum | 1 | | |
| | Wax antiozonant | 2 | | |
| | Octylated diphenylamine | 2 | 20 | 27 |
| | FEF Black | 45 | | |
| | Hard Clay | 20 | | |
| | Flexalyn 80-M$^{(h)}$ | 15 | | |
| | Butyl Oleate | 5 | | |
| | ZnO | 5 | | |
| | NA-22$^{(g)}$ | 0.75 | | |
| (c) | Neoprene W | 100 | | |
| | Stearic acid | 0.5 | | |
| | Magnesia | 4 | | |
| | Petrolatum | 1 | | |
| | Akroflex CD$^{(i)}$ | 2 | 44 | 40 |
| | SRF black | 100 | | |
| | MT black | 60 | | |
| | Light Process Oil | 8 | | |
| | Wax Antioxidant | 2 | | |
| | ZnO | 5 | | |
| | Thionex$^{(e)}$ | 0.5 | | |
| | DOTG$^{(j)}$ | 0.5 | | |
| | Sulfur | 1.25 | | |

3. Chlorosulfonated polyethylene — Hypalon

| | | | Mooney viscosity and scorch M/S at 250°F. | |
|---|---|---|---|---|
| | | | Visc. | 't10 |
| (a) | Hypalon 40 | 100 | | |
| | Litharge | 29.4 | | |
| | Polyethylene, low molecular | 2 | | |
| | SRF black | 55 | 15 | 20 |
| | Sundex 790$^{(k)}$ | 30 | | |
| | MBTS$^{(l)}$ | 0.5 | | |
| | Tetrone A$^{(m)}$ | 2 | | |
| (b) | Hypalon 40 | 100 | | |
| | TiO$_2$ | 35 | | |
| | Whiting (CaCO$_3$) | 50 | | |
| | MgO | 4 | 36 | 26 |
| | Pentaerythritol 200 | 3 | | |
| | Thiuram M$^{(c)}$ | 2 | | |
| | Sulfur | 1 | | |
| (c) | Hypalon 40 | 100 | | |
| | TiO$_2$ | 35 | | |
| | Whiting (CaCO$_3$) | 50 | 54 | 34 |
| | MgO | 20 | | |
| | Tetrone A$^{(m)}$ | 2 | | |
| | HVA-2$^{(n)}$ | 1 | | |

4. SBR

| | | | Mooney viscosity and scorch M/S at 250°F. | |
|---|---|---|---|---|
| | | | Visc. | 't10 |
| (a) | SBR 1502 | 100 | | |
| | ZnO | 4 | | |
| | HAF Black | 40 | | |
| | Stearic acid | 2 | | |
| | Light process oil | 20 | 18 | 12 |
| | MBT$^{(b)}$ | 0.8 | | |
| | Diphenylguanidine | 0.5 | | |
| | Sulfur | 2 | | |
| (b) | SBR 1502 | 100 | | |
| | ZnO | 4 | | |
| | HAF Black | 50 | | |
| | Stearic acid | 2 | 23 | 25 |
| | Light process oil | 5 | | |
| | Conac N-S$^{(o)}$ | 1 | | |
| | Sulfur | 2 | | |
| (c) | SBR 1502 | 100 | | |
| | ZnO | 4 | | |
| | HiSil 233$^{(p)}$ | 50 | | |

|                |      |    |    |
|----------------|------|----|----|
| Naphthenic Oil | 5    | 46 | 35 |
| MBTS(2)        | 0.75 |    |    |
| DOTG(3)        | 1.5  |    |    |
| Sulfur         | 3    |    |    |

Footnotes:
(a)Process Oil (Sun Oil Co.)
(b)Mercaptobenzothiazole
(c)Tetramethylthiuram disulfide
(d)Chlorinated polyphenyl (Monsanto)
(e)Tetramethylthiourea monosulfide (Du Pont)
(f)N-phenyl-1-naphthylamine (Du Pont)
(g)Neoprene accelerator, 2-mercapto-2-imidazoline
(h)A wood rosin acid ester with diethylene glycol (Hercules)
(i)Antioxidant mixture of 65% N-phenyl-2-naphthylamine and 35% of N,N'-diphenyl(p-phenylenediamine) (Du Pont)
(j)Di(o-tolyl)guanidine
(k)Aromatic process oil (Sun Oil)
(l)Benzothiazyl disulfide
(m)Dipentamethylene thiuram disulfide (Du Pont)
(n)N,N'-(m-phenylenebismaleimide)
(o)N-tert-butyl-2-benzothiazylsulfenamide (Du Pont)
(p)Precipitated, hydrated silica (PPG Industries)

This invention is now illustrated by the following representative example in which all parts, proportions, and percentages are by weight.

EXAMPLE

The elastomeric stock is a terpolymer of ethylene, propylene, and hexadiene having uncompounded Mooney viscosity ML (1+4) of about 35 at 250°F. The stock is compounded as follows:

|                                          | Parts |
|------------------------------------------|-------|
| Elastomer stock                          | 100   |
| Zinc oxide                               | 5     |
| Zinc stearate                            | 1.5   |
| FEF carbon black                         | 120   |
| Low aromatics process oil                | 45    |
| Sulfur                                   | 3     |
| Zinc O,O-dibutyl phosphorodithiate       | 2     |
| N-oxydiethylene-2-benzothiazole 2-sulfenamide | 1 |

The Mooney viscosity of the above rubber compound M/S at 250°F. is minimum 42 and scorch value 26 minutes to 10-point rise.

In another preferred embodiment, 30 parts of polyethylene can be substituted for 30 parts of the above EPDM rubber.

A preferred arrangement embodying features of this invention for achieving the optimum molding cycle with the above EPDM compound involves a 1,000 ton hydraulic clamp, horizontally acting, four rod type, injection molding press with a single stage screw injection, the screw being equipped with a non-return valve and used as the injection plunger as described above, and specifically having the following additional characteristics, or features, and operating conditions:

| | |
|---|---|
| Maximum clamp stroke | 45 inches |
| Platen size (Horizontal × Vertical dim.) | 60 inches × 60 inches |
| Tie Rod diameter | 8 inches |
| Clamp closing speed | 915 inches/minute |
| Clamp opening speed | 730 inches/minute |
| Injection capacity | 254.5 cubic inches (160 ounces) |
| Masticating and heating rate at 50% injection capacity (per SPI Test - General Purpose Styrene) | 3.5 ounces/second |
| Injection pressure maximum | 20,000 psi |
| Maximum injection rate at maximum pressure | 65 cubic inches/second |
| Injection stroke | 16 inches |
| Screw member diameter | 4½ inches |
| Barrel member length/diameter ratio | 16:1 |
| Screw member torque | 60,000 inch/pounds at 48-94 RPM |
| Screw member speed | 52-65 RPM |
| Nozzle diameter | inlet ½ inch, exit ⅝ inch |
| Sprue bushing diameter | inlet ¾ inch, exit 1 inch |
| Runners | ⅝ inch full round runners 16 inches long |
| Gates | 4 inch fan type, ¼ inch thick |

| Temperatures (°F.) | |
|---|---|
| Feed Stock - 70-75 | Nozzle extrudate material-290 (corresponds to pressure differential of about 5000 psig) |
| Barrel member (see FIG. 1) | |
| Zone 1 - 120 | |
| | Stationary mold - 350-360 |
| Zone 2 - 140 | |
| | Movable mold - 350-360 |
| Zone 3 - 165-170 | |
| | Stock entering mold cavity - 350 (corresponds to pressure differential of about 8000 psig after passing sprue bushing, runners and gates) |
| Zone 4 - 185-190 | |
| Stock in shot zone- 245 | |
| Nozzle surface: rear 350 front 380 | |
| | Internal screw member - 70-75 Cylinder closure member - 170-175 |

| Pressures (psig) on material | |
|---|---|
| Inject - 17,000 | Hold - 17,000 |
| Back - 50 | Clamping force - 1000 tons |

| Times (Sec.) | |
|---|---|
| Ram movement injection - 27 | |
| Delay between cycles - 35 | Masticating and heating- 35-40 |
| Cure - 80 | Mold cycle - 135 |

Stock Size
Injected material - 8 pounds

The resulting molded material has the following physical properties:

100% Modulus, psi - 900
Tensile strength, psi - 2200
Elongation at break, % - 250
Hardness, Shore A - 77
Tear strength (die C), pli - 200
Compression set, B, 22 hrs. at 158°F., % set - 20

It is believed that novel and improved process and apparatus combinations for successful high speed injection molding and curing large objects of elastomeric material have been provided in accordance with the objects of the invention.

Although specific preferred embodiments have been described, many variations and modifications within the spirit of the invention will occur to those skilled in the art and such are intended to be included within the scope of the following claims.

I claim:

1. A process for high speed injection-molding of elastomeric articles weighing at least four pounds and having at least one cross-sectional dimension greater than one-quarter inch, said process comprising the following sequential steps:
  1. supplying at a temperature within the range of about room temperature to 150°F. at least 4 pounds of solid, uncured, precompounded, heat-curable, elastomeric stock having a minimum Mooney viscosity value, M/S, at 250°F. of about 5-60 and a Mooney scorch value of 10-40 minutes to 10-point rise to the barrel of an injection-molding machine;
2. masticating and heating the elastomeric stock in the barrel while transporting it forward by means of a screw; the barrel being heated to such a temperature that the elastomeric stock, which is heated both by the walls of the barrel and by the mastication, reaches in the forward end of the barrel a uniform temperature of about 220°–260°F.; the masticating and heating time being less than about 60 seconds;
3. forcing the elastomeric stock through a nozzle and one or more restricted passages in the mold at a sufficient pressure to heat the stock to about 320°–400°F. into a mold cavity maintained at substantially the same temperature as the incoming rubber stock, the temperature of the stock exiting from the nozzle being within the range of 270° to 300°F., and the mold filling time being less than about 30 seconds;
4. allowing the stock to remain in the mold cavity for a period of about 20–90 seconds, during which time the stock is both shaped and uniformly cured.

2. The process of claim 1 wherein a new batch of elastomeric stock is introduced into the barrel within 30 seconds after step (3) has been completed.

* * * * *